(12) United States Patent
Pan

(10) Patent No.: US 8,141,446 B2
(45) Date of Patent: Mar. 27, 2012

(54) SPEED CHANGING TRANSMISSION MECHANISM OF SHEET LAMINATING APPARATUS

(75) Inventor: Yung-Tai Pan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 664 days.

(21) Appl. No.: 12/341,361

(22) Filed: Dec. 22, 2008

(65) Prior Publication Data
US 2010/0101344 A1    Apr. 29, 2010

(30) Foreign Application Priority Data

Oct. 24, 2008 (TW) ................ 97140785 A

(51) Int. Cl.
*F16H 19/00* (2006.01)
*B30B 15/26* (2006.01)
*B30B 15/16* (2006.01)

(52) U.S. Cl. ............... 74/322; 74/321; 100/43; 100/47; 100/52

(58) Field of Classification Search .............. 74/321, 74/322; 156/349; 100/43, 47, 52
See application file for complete search history.

(56) References Cited

U.S. PATENT DOCUMENTS

| | | | | |
|---|---|---|---|---|
| 3,951,540 A * | 4/1976 | Ogawa | ........................... | 399/212 |
| 4,050,372 A * | 9/1977 | Kobiella | ........................... | 100/2 |
| 4,545,676 A * | 10/1985 | Kato | ........................... | 399/195 |
| 5,365,320 A * | 11/1994 | Takano et al. | .................. | 399/322 |
| 7,912,417 B2 * | 3/2011 | Yoshida | ........................ | 399/388 |

FOREIGN PATENT DOCUMENTS

JP        63081027 A   *  4/1988

* cited by examiner

*Primary Examiner* — Tisha Lewis
(74) *Attorney, Agent, or Firm* — Kirton McConkie; Evan R. Witt

(57) ABSTRACT

A speed changing transmission mechanism of a sheet laminating apparatus includes a reverse module, a power output shaft, a first power output roller, a second power output roller, a first belt, a second belt, a power input module and a shift module. Utilizing the reverse module, the power input module and the shift module, the speed changing transmission mechanism is capable of hot laminating the sheet article and withdrawing the jammed sheet article.

18 Claims, 6 Drawing Sheets

SPEED CHANGING TRANSMISSION MECHANISM OF SHEET LAMINATING APPARATUS

FIELD OF THE INVENTION

The present invention relates to a sheet laminating apparatus, and more particularly to a sheet laminating apparatus for laminating a sheet article between two pieces of thermoplastic films.

BACKGROUND OF THE INVENTION

Conventionally, a sheet article such as a document or a photo is usually covered with a protective film for protection because such a sheet article is readily suffered from damage. Typically, a sheet laminating apparatus is used for laminating a sheet article between two pieces of protective films in order to achieve the protective purpose. Hereinafter, the configurations of a conventional sheet laminating apparatus will be illustrated with reference to FIG. 1.

Referring to FIG. 1, a schematic cross-sectional view of a conventional sheet laminating apparatus is illustrated. The sheet laminating apparatus 10 of FIG. 1 principally comprises a heat-treating mechanism 20, a transmitting and pressing mechanism 30 and a transfer passage 40. The heat-treating mechanism 20 includes an electrically-heated plate 21 and a heater 22.

The process for laminating a sheet article (not shown) by using the sheet laminating apparatus 10 will be described as follows. First of all, the sheet article is sandwiched between an upper thermoplastic film and a lower thermoplastic film to form a sandwich structure. Then, the sandwich structure is fed into the transfer passage 40 of the sheet laminating apparatus 10 through an entrance 41. By means of the transmitting and pressing mechanism 30, the sandwich structure is continuously transported through the passage 40. During this stage, the electrically-heated plate 21 of the heat-treating mechanism 20 transforms electricity to heat energy so as to preheat the sandwich structure. The heat energy generated by the electrically-heated plate 21 is uniformly distributed over the heater 22, and radiated through an air gap between the heater 22 and the transmitting and pressing mechanism 30 so as to heat up the transmitting and pressing mechanism 30. The transmitting and pressing mechanism 30 presses against opposite sides of the sandwich structure which is transported through the transfer passage 40, and transmits the heat energy to the sandwich structure so as to soften the thermoplastic films. The heating and pressing procedure is also referred as a laminating procedure. After being transmitted and pressed by the transmitting and pressing mechanism 30, the sheet article bonds with the softened thermoplastic films to form a laminate structure. Meanwhile, the sheet article is fixed between these two pieces of thermoplastic films.

For most conventional sheet laminating apparatuses utilizing heat energy to laminate sheet articles, the problem of getting jammed is commonly found. In a case that the sheet article is adhered to the transmitting and pressing mechanism 30 during the process of transmitting and pressing the sandwich structure, or in another case that the thermoplastic films become too soft due to the elevated temperature, the possibility of getting jam in the transfer passage 40 is largely increased. If the sheet article is jammed in the transfer passage 40, the user may generally pull out the jammed sheet article by exerting a pulling force on the sheet article. If the problem of getting jammed is very serious, however, the pulling force is usually insufficient to pull out the jammed sheet article. Under this circumstance, the sheet laminating apparatus may have a breakdown.

In a case that the documents having different thickness are laminated by the sheet laminating apparatus at the same laminating speed, different working temperatures are used. As the thickness of the document is increased, the working temperature is increased. Whereas, as the thickness of the document is decreased, the working temperature is decreased. As known, the process of adjusting the working temperature of the sheet laminating apparatus is time consuming. For example, if the working temperature of the sheet laminating apparatus is increased from 100° C. to 130° C. for laminating a thicker document, a heating time period is required. At this time, the sheet laminating apparatus is capable of laminating the documents at a working temperature of 130° C. or more. On the other hand, for laminating the document at a working temperature lower than 130° C., a cooling time period is required to decrease the working temperature.

For solving the above drawbacks, a variable-speed sheet laminating apparatus was developed. The variable-speed sheet laminating apparatus is operated at a constant working temperature but variable hot press speeds to laminate documents of various thicknesses. As the thickness of the document is increased, the hot press speed is increased. Whereas, as the thickness of the document is decreased, the hot press speed is decreased. Since a controller is used to adjust the rotating speeds of the motor, the conventional variable-speed sheet laminating apparatus is not cost-effective.

SUMMARY OF THE INVENTION

It is an object of the present invention to provide a sheet laminating apparatus that is operated at variable hot press speeds.

Another object of the present invention provides a sheet laminating apparatus having a speed changing transmission mechanism.

In accordance with an aspect of the present invention, there is provided a speed changing transmission mechanism of a sheet laminating apparatus for driving a hot press roller of the sheet laminating apparatus to rotate at a first rotating speed or a second rotating speed or in a reverse direction. The speed changing transmission mechanism includes a reverse module, a power output shaft, a power input module, and a shift module. The reverse module is used for withdrawing a sheet article from the sheet laminating apparatus when the hot press roller is operated in the reverse direction. The reverse module includes a reverse gear and a reverse clutch gear arranged at a first side of the reverse gear. The power output shaft penetrates through the reverse gear and the reverse clutch gear. The power input module is used for providing motive power to rotate the power output shaft. The power input module includes a first rotating speed driving roller, a second rotating speed driving roller, a clutch gear, a power input shaft and a unidirectional motor. The clutch gear is engaged with the reverse module. The power input shaft penetrates through the first rotating speed driving roller, the second rotating speed driving roller and the clutch gear. The unidirectional motor provides the motive power to the power output shaft. The shift module is contacted with the reverse clutch gear and the clutch gear for moving the reverse clutch gear along the power output shaft to be coupled with the reverse gear, or moving the clutch gear to be coupled with either the first rotating speed driving roller or the second rotating speed driving roller. The hot press roller is rotated in the reverse direction if the reverse clutch gear is coupled with the reverse gear. The hot press roller is rotated in the first rotating speed if the clutch gear is coupled with the first rotating speed driving roller. The hot press roller is rotated in the second rotating speed if the clutch gear is coupled with the second rotating speed driving roller.

In an embodiment, the reverse gear includes a reverse gear recess and a recess ratchet pawl. The reverse clutch gear includes a connecting ratchet pawl. The connecting ratchet pawl is inserted into the reverse gear recess and engaged with the recess ratchet pawl when the reverse clutch gear is coupled with the reverse gear.

In an embodiment, the clutch gear includes an elastic post and a spring. The spring is formed in a surface of the clutch gear and connected with the elastic post such that the elastic post is protruded from the surface of the clutch gear.

In an embodiment, the first rotating speed driving roller has a first indentation. The elastic post is received in the first indentation when the clutch gear is coupled with the first rotating speed driving roller.

In an embodiment, the first rotating speed driving roller has a second indentation. The elastic post is received in the second indentation when the clutch gear is coupled with the second rotating speed driving roller.

In an embodiment, the first rotating speed is slower than the second rotating speed. The first rotating speed driving roller is smaller than the second rotating speed driving roller.

In an embodiment, the first rotating speed driving roller has a first circular hole, the second rotating speed driving roller has a second circular hole, and the clutch gear has a first D-shaped hole.

In an embodiment, the power input shaft penetrating through the first rotating speed driving roller, the second rotating speed driving roller and the clutch gear is a D-shaped shaft. When the power input shaft is driven to rotate, the first rotating speed driving roller having the first circular hole and the second rotating speed driving roller having the second circular hole are not rotated with the power input shaft but the clutch gear having the first D-shaped hole is rotated with the power input shaft.

In an embodiment, the speed changing transmission mechanism further includes a first power output roller and a second power output roller. The first power output roller is arranged at the first side of the reverse gear. The second power output roller is arranged at a second side of the reverse gear. The power output shaft further penetrates through the first power output roller and the second power output roller.

In an embodiment, the reverse gear has a third circular hole, the reverse clutch gear has a second D-shaped hole, the first power output roller has a third D-shaped hole, and the second power output roller has a fourth D-shaped hole.

In an embodiment, the power output shaft penetrating through the reverse gear, the reverse clutch gear, the first power output roller and the second power output roller is a D-shaped shaft. When the power output shaft is driven to rotate, the reverse gear having the third circular hole is not rotated with the D-shaped power output shaft, but the reverse clutch gear having the second D-shaped hole, the first power output roller having the third D-shaped hole, and the second power output roller having the fourth D-shaped hole are rotated with the power output shaft.

In an embodiment, the speed changing transmission mechanism further includes a first belt and a second belt. The first belt surrounds around the first power output roller and the first rotating speed driving roller. The second belt surrounds around the second power output roller and the second rotating speed driving roller.

In an embodiment, the first power output roller and the second power output roller are belt pulleys.

In an embodiment, the shift module further includes a gliding groove, a shift lever, a reverse shift switching element and a speed changing shift switching element. The shift lever is partially embedded in the gliding groove and movable along the gliding groove. The reverse shift switching element is disposed in the gliding groove and in contact with the reverse clutch gear. The speed changing shift switching element is disposed in the gliding groove and in contact with the clutch gear. After the shift lever is coupled with the reverse shift switching element, the shift lever is moved such that the reverse clutch gear is coupled with the reverse gear. Alternatively, after the shift lever is coupled with the speed changing shift switching element, the shift lever is moved such that the clutch gear is coupled with the first rotating speed driving roller or the second rotating speed driving roller.

In an embodiment, the power output shaft further penetrates through the hot press roller and a hot press gear. The speed changing transmission mechanism and the hot press gear are arranged on opposite sides of the hot press roller.

In an embodiment, the speed changing transmission mechanism further includes a transmission gear engaged with the hot press gear. The transmission gear is driven to rotate when the hot press gear is rotated with the power output shaft.

In an embodiment, the speed changing transmission mechanism further includes a transmission shaft penetrating through the transmission gear such that the transmission shaft is rotated with the transmission gear.

In an embodiment, the speed changing transmission mechanism further includes an additional hot press roller parallel with the hot press roller such that the hot press roller and the additional hot press roller are rotated in opposite directions.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
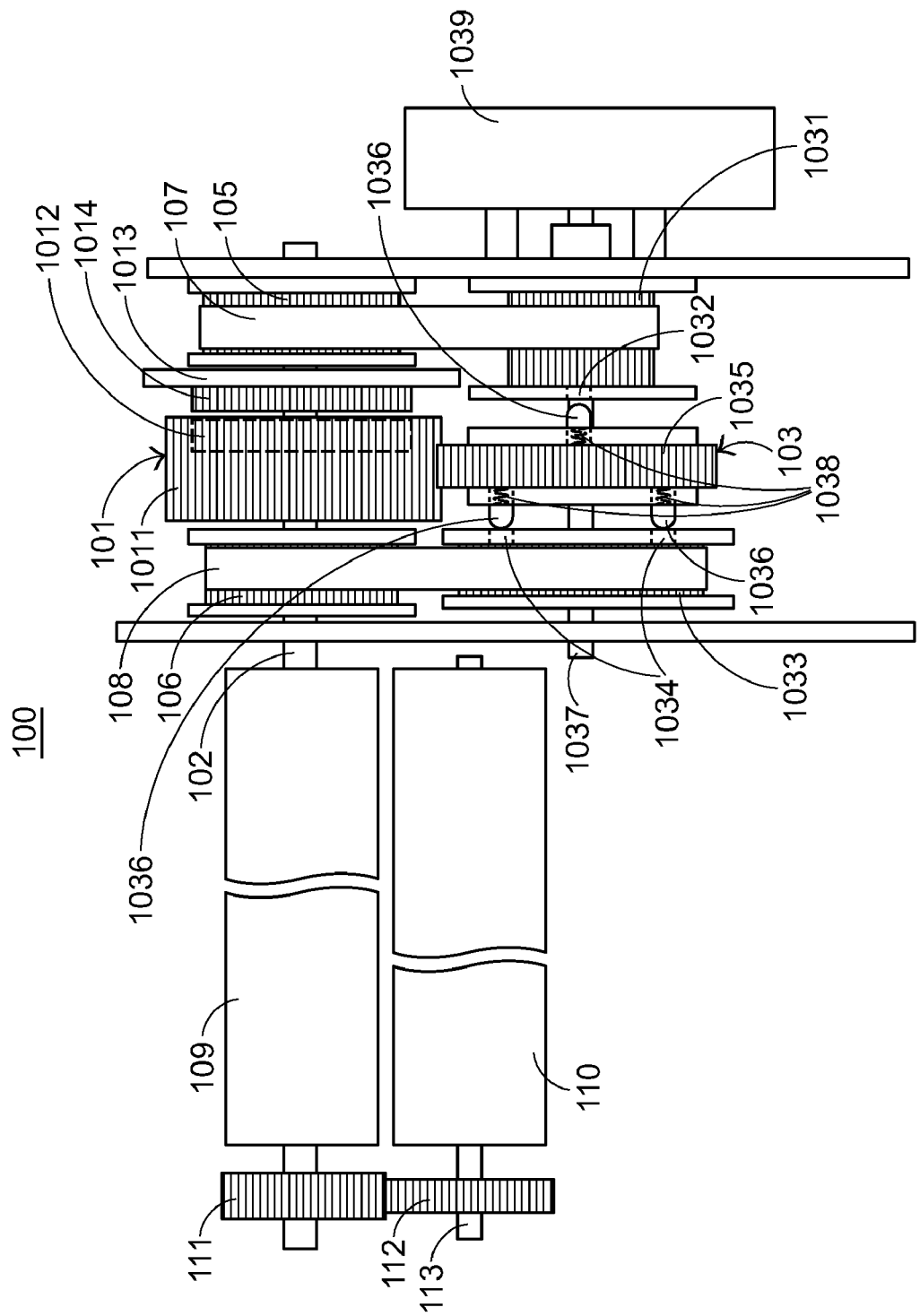
FIG. 2 is a schematic view illustrating a sheet laminating apparatus having a speed changing transmission mechanism according to a preferred embodiment of the present invention.
Figure 5:
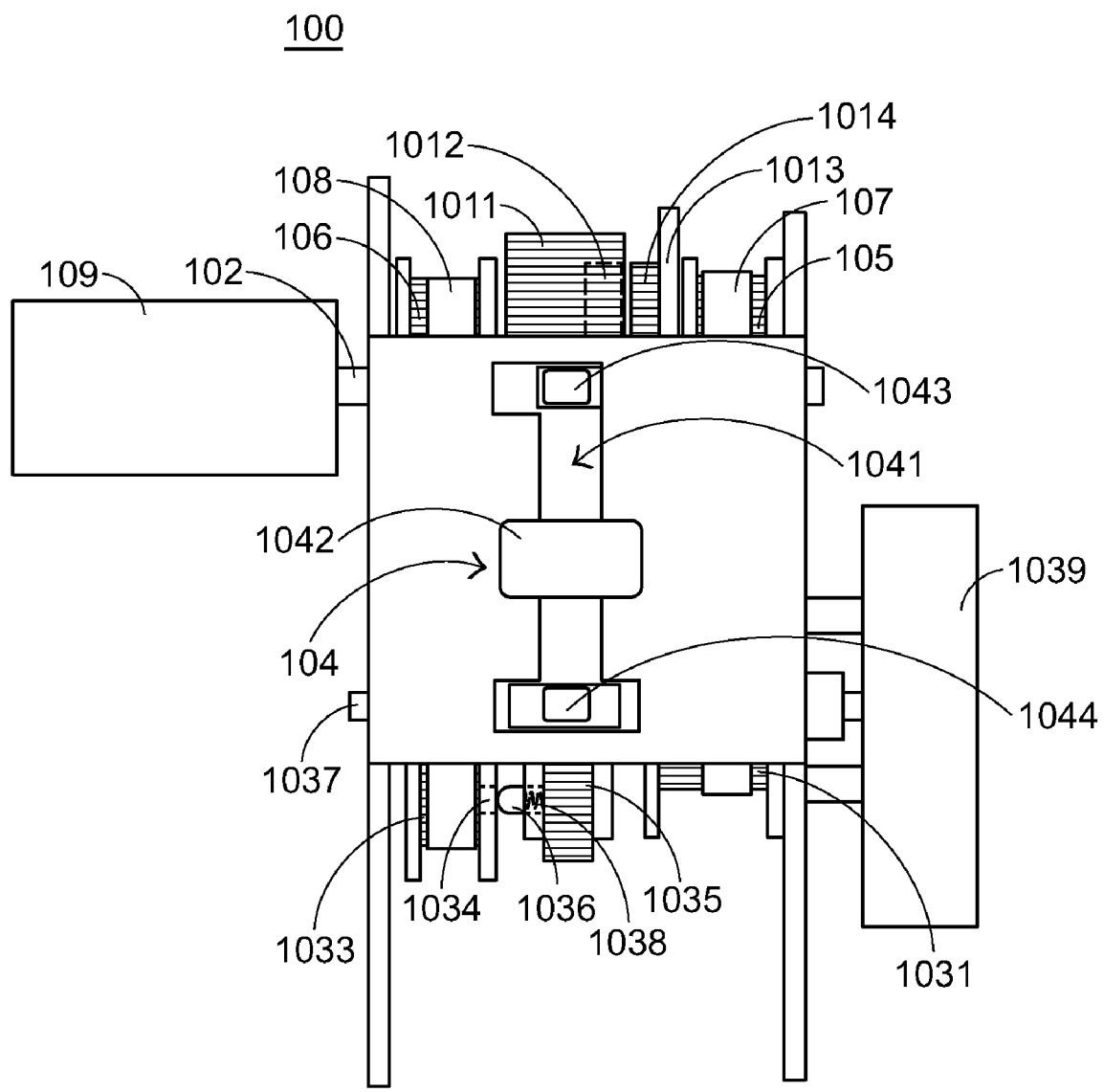
FIG. 5 is a schematic top view illustrating the speed changing transmission mechanism of the sheet laminating apparatus according to the preferred embodiment of the present invention.

For solving the drawbacks encountered from the prior art, the present invention provides a sheet laminating apparatus having a speed changing transmission mechanism. FIG. 2 is a schematic view illustrating a sheet laminating apparatus having a speed changing transmission mechanism according to a preferred embodiment of the present invention. As shown in FIG. 2, the speed changing transmission mechanism 100 of the sheet laminating apparatus principally comprises a reverse module 101, a power output shaft 102, a first power output roller 105, a second power output roller 106, a first belt 107, a second belt 108, a power input module 103 and a shift module 104 (as shown in FIG. 5).

The reverse module 101 is used for withdrawing a sheet article. The reverse module 101 comprises a reverse gear 1011 and a reverse clutch gear 1013. The reverse gear 1011 has a reverse gear recess 1012. A recess ratchet pawl (not shown) is formed on the inner surface of the reverse gear recess 1012. The reverse clutch gear 1013 is arranged at a first side of the reverse gear 1011 and comprises a connecting ratchet pawl 1014. The first power output roller 105 is also arranged at the first side of the reverse gear 1011. The second power output roller 106 is arranged at a second side of the reverse gear 1011. The first power output roller 105 and the second power output roller 106 are belt pulleys. The power output shaft 102 penetrates through the reverse gear 1011, the reverse clutch gear 1013, the first power output roller 105 and the second power output roller 106. The power output shaft 102 is further penetrated through a hot press roller 109 and a hot press gear 111. A transmission shaft 113 penetrates through another hot press roller 110 and a transmission gear 112. The hot press roller 110 is parallel with the hot press roller 109. Since the transmission gear 112 is engaged with the hot press gear 111, the hot press roller 110 and the hot press roller 109 are rotated in opposite directions. When the power output shaft 102 is driven to rotate the hot press roller 109, the hot press gear 111 is simultaneously rotated to drive rotation of the hot press gear 111 in the opposite direction. As a consequence, the hot press roller 110 is rotated in a direction opposite to the hot press roller 109.

The power input module 103 is used for providing motive power required to rotate the power output shaft 102. The power input module 103 comprises a first rotating speed driving roller 1031, a second rotating speed driving roller 1033, a clutch gear 1035, a power input shaft 1037 and a unidirectional motor 1039. The first rotating speed driving roller 1031 is smaller than the second rotating speed driving roller 1033 in dimension. Several first indentations 1032 are formed in a lateral flat surface of the first rotating speed driving roller 1031. Similarly, several second indentations 1034 are formed in a lateral flat surface of the second rotating speed driving roller 1033. The clutch gear 1035 is engaged with the reverse gear 1011 of the reverse module 101. Corresponding to the locations of the first indentation 1032 and the indentations 1034, several elastic posts 1036 are protruded from bilateral flat surfaces of the clutch gear 1035. The elastic posts 1036 are sustained against corresponding springs 1038 that are disposed in bilateral flat surfaces of the clutch gear 1035. The power input shaft 1037 penetrates through the first rotating speed driving roller 1031, the second rotating speed driving roller 1033 and the clutch gear 1035. The power input shaft 1037 is also connected to the unidirectional motor 1039 to acquire the motive power that is supplied by the unidirectional motor 1039. The first belt 107 surrounds around the first power output roller 105 and the first rotating speed driving roller 1031 such that a transmission relation between the first power output roller 105 and the first rotating speed driving roller 1031 is established. The second belt 108 surrounds around the second power output roller 106 and the second rotating speed driving roller 1033 such that a transmission relation between the second power output roller 106 and the second rotating speed driving roller 1033 is established. The operations of the shift module 104 will be described later.

Figure 3:
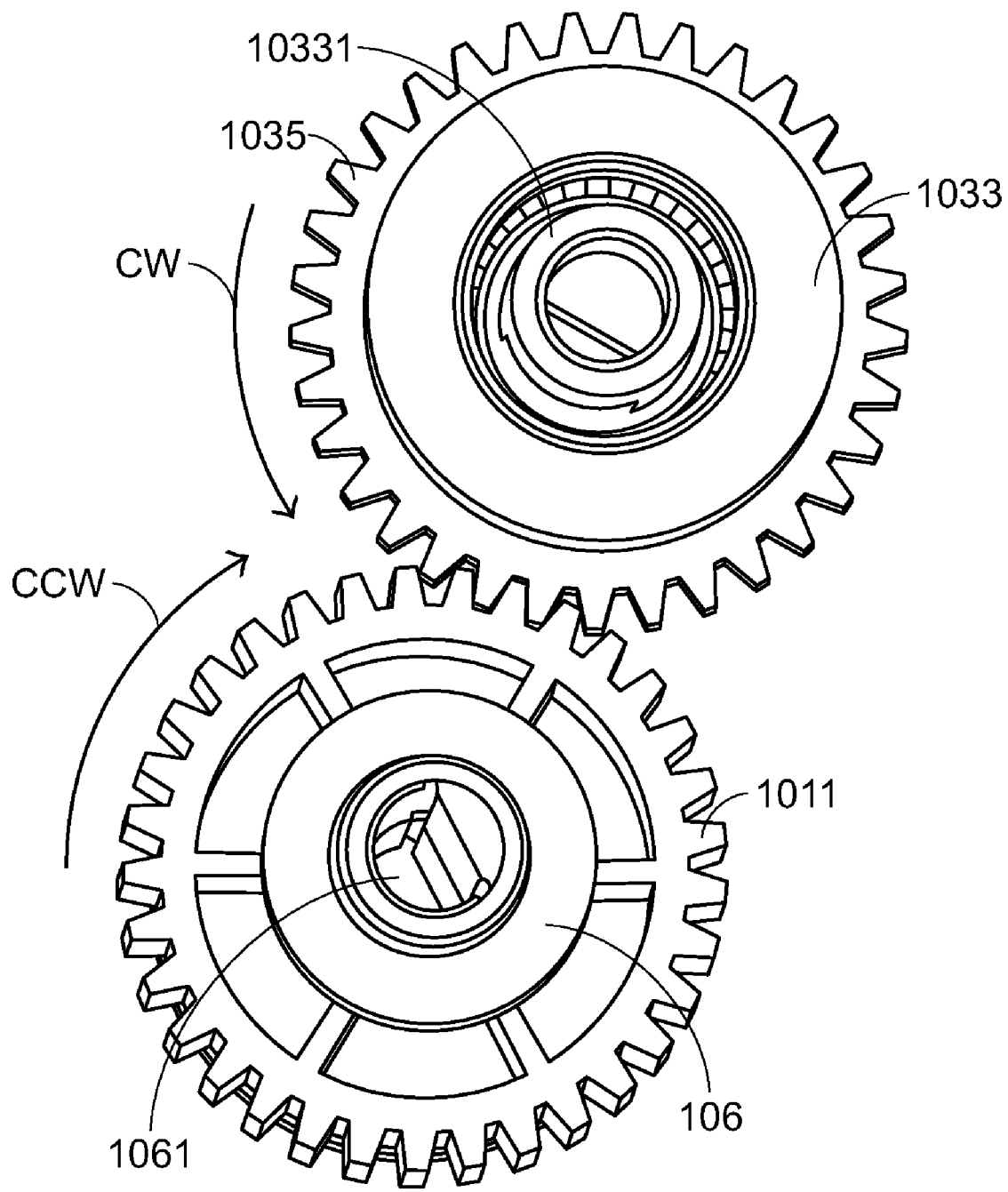
FIG. 3 is a schematic side view illustrating some gear components of the speed changing transmission mechanism of the sheet laminating apparatus according to the preferred embodiment of the present invention.

FIG. 3 is a schematic side view illustrating some gear components of the speed changing transmission mechanism of the sheet laminating apparatus according to the preferred embodiment of the present invention. As shown in FIG. 3, the clutch gear 1035 of the power input module 103 is engaged with the reverse gear 1011 of the reverse module 101. In addition, the second power output roller 106 has a fourth D-shaped hole 1061. The second rotating speed driving roller 1033 has a second circular hole 10331.

Figure 4:
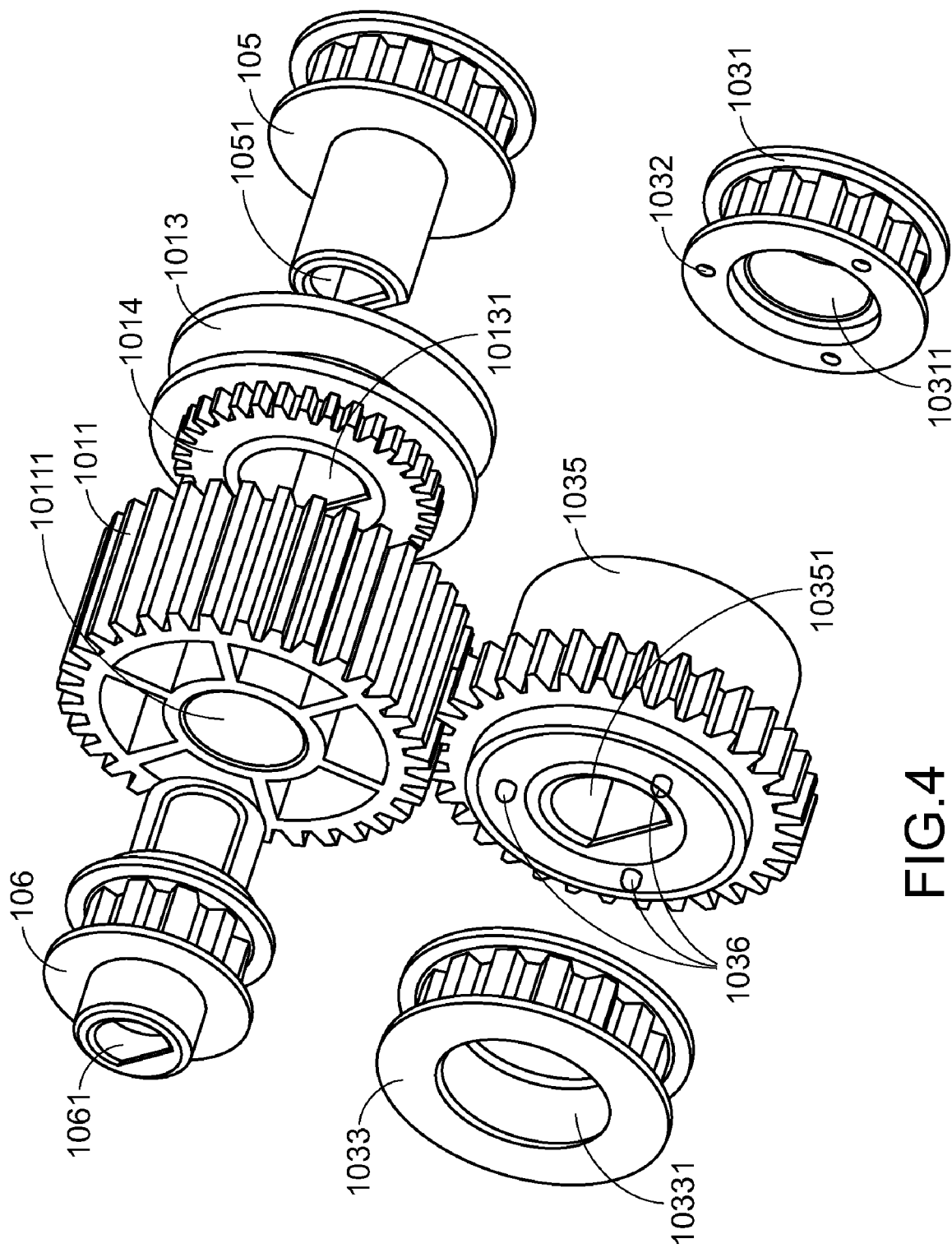
FIG. 4 is a schematic perspective view illustrating some gear components of the speed changing transmission mechanism of the sheet laminating apparatus that are taken from a different viewpoint.

FIG. 4 is a schematic perspective view illustrating some gear components of the speed changing transmission mechanism of the sheet laminating apparatus that are taken from a different viewpoint. As shown in FIG. 4, the first rotating speed driving roller 1031 has a first circular hole 10311. The second rotating speed driving roller 1033 has a second circular hole 10331. The clutch gear 1035 has a first D-shaped hole 10351. The reverse gear 1011 has a third circular hole 10111. The reverse clutch gear 1013 has a second D-shaped hole 10131. The first power output roller 105 has a third D-shaped hole 1051. The second power output roller 106 has a fourth D-shaped hole 1061. The power input shaft 1037 is a D-shaped shaft, which penetrates through the first circular hole 10311, the first D-shaped hole 10351 and the second circular hole 10331. The power output shaft 102 is also a D-shaped shaft, which penetrates through the third D-shaped hole 1051, the second D-shaped hole 10131, the third circular hole 10111 and the fourth D-shaped hole 1061. Please refer to FIG. 2 again. When the D-shaped power input shaft 1037 is driven to rotate by the unidirectional motor 1039, the first rotating speed driving roller 1031 and the second rotating speed driving roller 1033 that have circular holes are not rotated with the D-shaped power input shaft 1037. Whereas, the clutch gear 1035 that has the D-shaped hole is rotated with the D-shaped power input shaft 1037. Similarly, the reverse gear 1011 that hat has a circular hole is not rotated with the D-shaped power output shaft 102; but the first power output roller 105, the reverse clutch gear 1013 and the second power output roller 106 that have the D-shaped holes are rotated with the D-shaped power output shaft 102.

Figure 6:
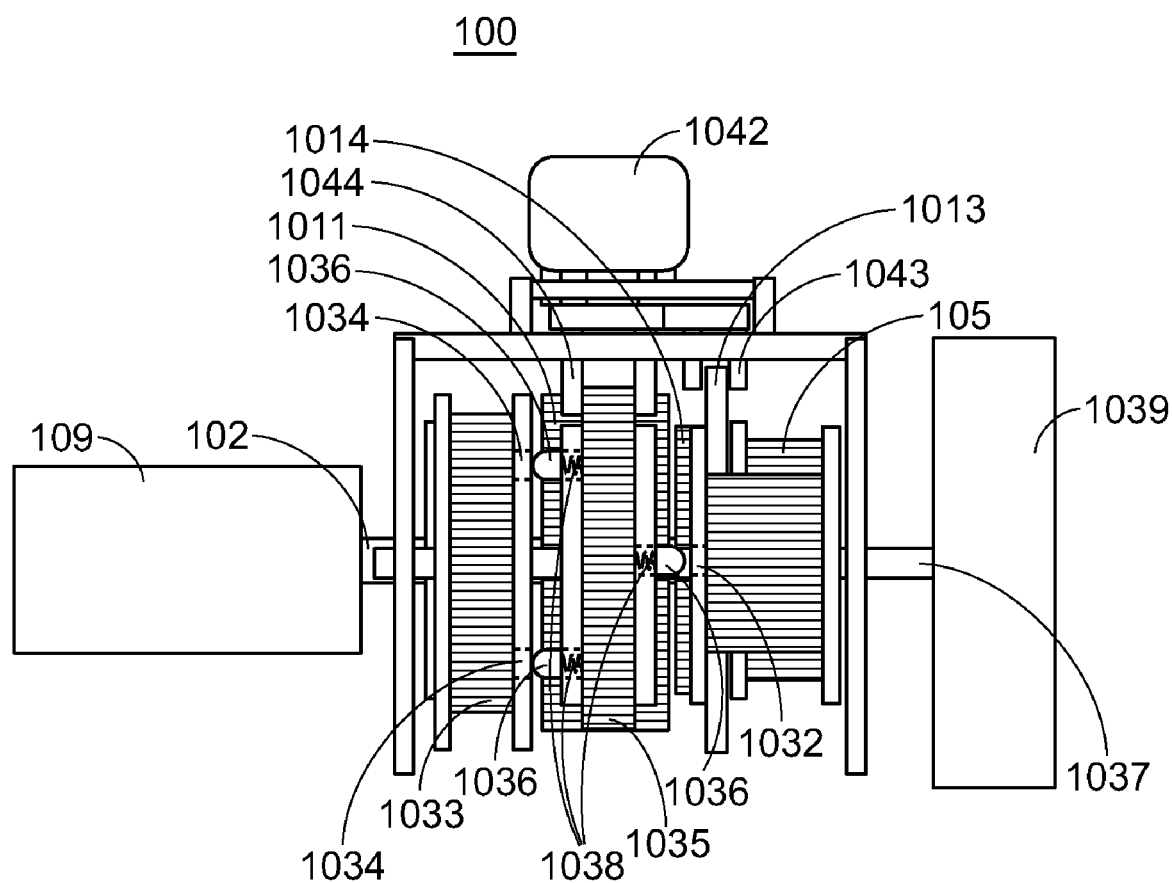
FIG. 6 is a schematic front view illustrating the speed changing transmission mechanism of the sheet laminating apparatus according to the preferred embodiment of the present invention.

FIG. 5 is a schematic top view illustrating the speed changing transmission mechanism of the sheet laminating apparatus according to the preferred embodiment of the present invention. FIG. 6 is a schematic front view illustrating the speed changing transmission mechanism of the sheet laminating apparatus according to the preferred embodiment of the present invention. Please refer to FIGS. 5 and 6. The shift module 104 comprises a gliding groove 1041, a shift lever 1042, a reverse shift switching element 1043 and a speed changing shift switching element 1044. The shift lever 1042 is partially embedded in the gliding groove 1041 and controllable by the user to the moved along the gliding groove 1041. The reverse shift switching element 1043 is disposed in the gliding groove 1041 and clamps the reverse clutch gear 1013. The speed changing shift switching element 1044 is disposed in the gliding groove 1041 and clamps the clutch gear 1035.

For heating and pressing the sheet article at a first rotating speed, the shift lever 1042 is first moved to the speed changing shift switching element 1044. Next, the shift lever 1042 is moved toward the first rotating speed driving roller 1031 (in the right direction as shown in FIG. 5). As such, the speed changing shift switching element 1044 that clamps the clutch gear 1035 is moved in the right direction. At the same time, the clutch gear 1035 is moved along the power input shaft 1037 and thus coupled with the first rotating speed driving roller 1031. When the elastic posts 1036 on the clutch gear 1035 are contacted with and sustained against the flat surface of the first rotating speed driving roller 1031, the springs 1038 connected with the elastic posts 1036 are compressed and received in the flat surface of the clutch gear 1035. In addition, when the elastic posts 1036 on the clutch gear 1035 are contacted with the first rotating speed driving roller 1031, the first rotating speed driving roller 1031 is rotated such that the elastic posts 1036 are aligned with corresponding first indentions 1032. The elastic posts 1036 are then inserted into and received in the first indentions 1032. Meanwhile, the first rotating speed driving roller 1031 having the circular hole is synchronously rotated with the clutch gear 1035 having the D-shaped hole. Since the clutch gear 1035 is still engaged with the reverse gear 1011 but the reverse gear 1011 is not coupled with the reverse clutch gear 1013, the reverse clutch gear 1013 is idle running.

In this embodiment, the unidirectional motor 1039 is rotated in a clockwise direction. After the first rotating speed driving roller 1031 is driven to rotate by the unidirectional motor 1039, the first belt 107 surrounding the first rotating speed driving roller 1031 and the first power output roller 105 is synchronously rotated with the first rotating speed driving roller 1031 in the clockwise direction (as shown in FIG. 2). As a consequence, the first power output roller 105 is driven to rotate and the power output shaft 102 is rotated upon rotation of the first power output roller 105. Upon rotation of the power output shaft 102, the hot press roller 109 and the hot press roller 110 are rotated in opposite directions. That is, the hot press roller 109 is rotated in the clockwise direction but the hot press roller 110 is rotated in the anti-clockwise direction, thereby hot laminating the sheet article between two pieces of thermoplastic films.

Similarly, for heating and pressing the sheet article at a second rotating speed, the shift lever 1042 is moved to the left side such that the clutch gear 1035 is coupled with the second rotating speed driving roller 1033. The operation principles of hot press the sheet article at the second rotating speed are similar to that at the first rotating speed, and are not redundantly described herein. In this embodiment, the first rotating speed is slower than the second rotating speed.

In a case that the sheet article is jammed, the sheet article needs to be pull out of the sheet laminating apparatus. For removing the jammed sheet article, the shift lever 1042 is first moved to the reverse shift switching element 1043. Next, the shift lever 1042 is moved toward the reverse gear 1011 (in the left direction as shown in FIG. 5). As such, the reverse shift switching element 1043 that clamps the reverse clutch gear 1013 is moved in the left direction. The connecting ratchet pawl 1014 of the reverse clutch gear 1013 is inserted into the reverse gear recess 1012 of the reverse gear 1011 and engaged with the recess ratchet pawl (not shown) of the reverse gear 1011, so that the reverse clutch gear 1013 is coupled with the reverse gear 1011. Meanwhile, the reverse gear 1011 having the circular hole is synchronously rotated with the reverse clutch gear 1013 having the D-shaped hole. Since the clutch gear 1035 is still engaged with the reverse gear 1011 but is not coupled with the first rotating speed driving roller 1031 and the second rotating speed driving roller 1033, the first rotating speed driving roller 1031 and the second rotating speed driving roller 1033 are idle running.

After the reverse clutch gear 1013 is coupled with the reverse gear 1011, the unidirectional motor 1039 is still rotated in the clockwise direction CW. As a consequence, the power input shaft 1037 and the clutch gear 1035 are also rotated in the clockwise direction CW. Whereas, the reverse gear 1011 that is engaged with the reverse gear 1011 is rotated in the anti-clockwise direction CCW (as shown in FIG. 3).

Figure 1:
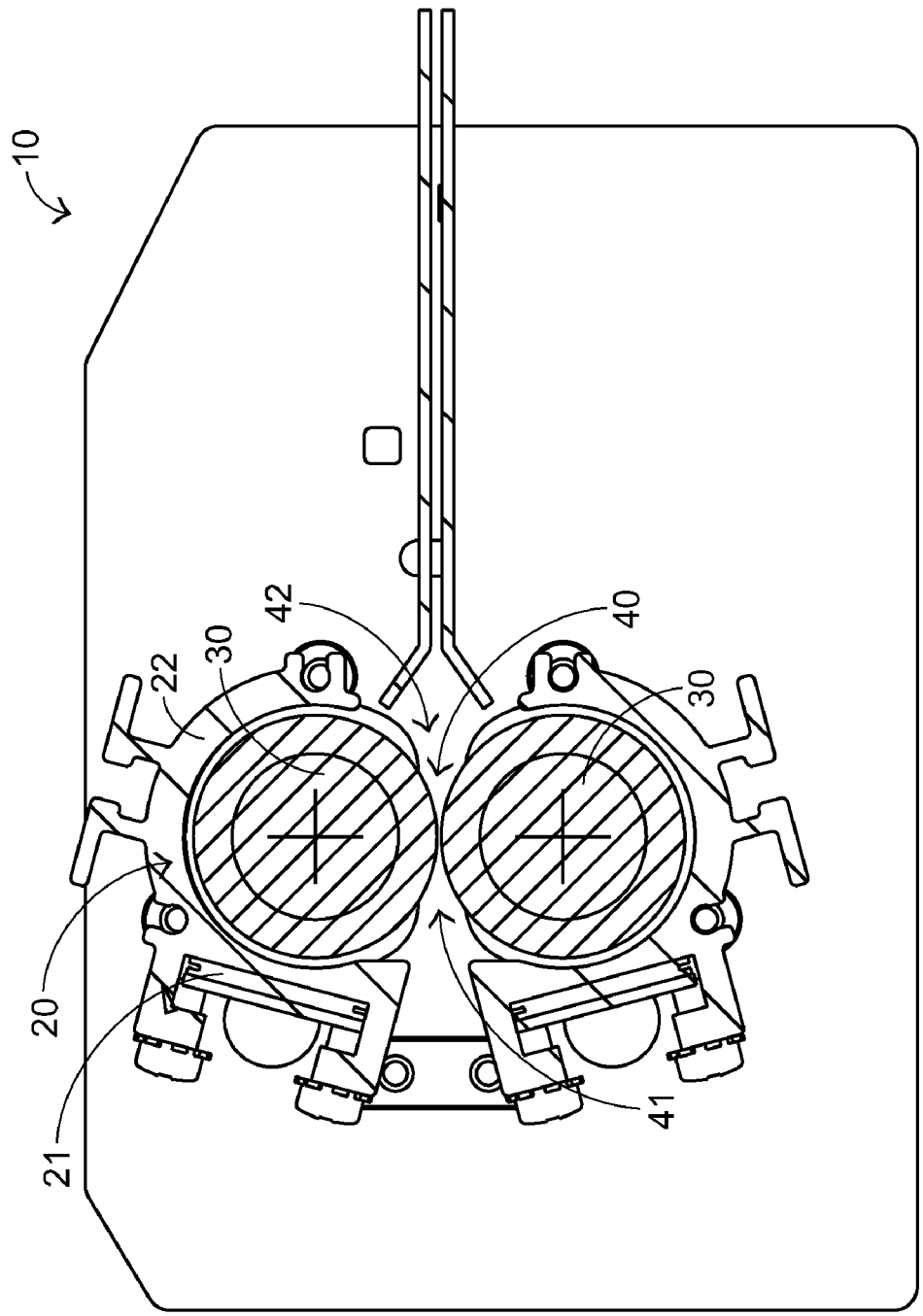
FIG. 1 is a schematic cross-sectional view of a conventional sheet laminating apparatus.

Please refer to FIGS. 1 and 2 again. Since the reverse gear 1011 is rotated in the anti-clockwise direction CCW, the reverse clutch gear 1013 that is coupled with the reverse gear 1011 is also rotated in the anti-clockwise direction CCW and thus the power output shaft 102 is rotated in the anti-clockwise direction CCW. In addition, the hot press roller 109 and the hot press gear 111 sheathed around the power output shaft 102 are rotated in the anti-clockwise direction. Since the transmission gear 112 is engaged with the hot press gear 111, the transmission gear 112 and the transmission shaft 113 penetrating through the hot press roller 110 are rotated in the clockwise direction. As such, the hot press roller 110 is rotated with the transmission shaft 113 in the clockwise direction. Meanwhile, the hot press roller 109 and the hot press roller 110 are reversely rotated to withdraw the sheet article.

In the above embodiments of the speed changing transmission mechanism of the present invention, the first rotating speed driving roller 1031 and the first power output roller 105 are belt pulleys. Nevertheless, the first rotating speed driving roller 1031 and the first power output roller 105 can be replaced by gears. Under this circumstance, an intermediate gear should be disposed between the first rotating speed driving roller 1031 and the first power output roller 105. The intermediate gear is engaged with both of the first rotating speed driving roller 1031 and the first power output roller 105 such that the first rotating speed driving roller 1031 and the first power output roller 105 are rotated in the same direction. Likewise, the second rotating speed driving roller 1033 and the second power output roller 106 may be belt pulleys or gears. The relation between the second rotating speed driving roller 1033 and the second power output roller 106 are similar to that between the first rotating speed driving roller 1031 and the first power output roller 105, and is not redundantly described herein.

From the above description, the speed changing transmission mechanism of the sheet laminating apparatus according to the present invention can be operated in a first rotating speed mode, a second rotating speed mode or a reverse rotation mode. In addition, the peed changing transmission mechanism has a function of withdrawing the jammed sheet article. By using the speed changing transmission mechanism of the present invention, the sheet laminating apparatus can be operated at different rotating speeds and at the same temperature in order to laminate the sheet articles of various thicknesses. Since no additional electronic controller is required to control the rotating speed of the motor, the sheet laminating apparatus of the present invention is more cost-effective. Moreover, if a jamming event occurs, the hot press rollers are reversely rotated to withdraw the sheet article, so that no additional costly bidirectional motor is required. In other words, the speed changing transmission mechanism of the sheet laminating apparatus according to the present invention has diverse functions and is cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speed changing transmission mechanism of a sheet laminating apparatus for driving a hot press roller of said sheet laminating apparatus to rotate at a first rotating speed or a second rotating speed or in a reverse direction, said speed changing transmission mechanism comprising:
- a reverse module for withdrawing a sheet article from said sheet laminating apparatus when said hot press roller is operated in said reverse direction, and comprising a reverse gear and a reverse clutch gear arranged at a first side of said reverse gear;
- a power output shaft penetrating through said reverse gear and said reverse clutch gear;
- a power input module for providing motive power to rotate said power output shaft, and comprising a first rotating speed driving roller, a second rotating speed driving roller, a clutch gear, a power input shaft and a unidirectional motor, wherein said clutch gear is engaged with said reverse module, said power input shaft penetrates through said first rotating speed driving roller, said second rotating speed driving roller and said clutch gear, and said unidirectional motor provides said motive power to said power output shaft; and
- a shift module contacted with said reverse clutch gear and said clutch gear for moving said reverse clutch gear along said power output shaft to be coupled with said reverse gear, or moving said clutch gear to be coupled with either said first rotating speed driving roller or said second rotating speed driving roller, wherein said hot press roller is rotated in said reverse direction if said reverse clutch gear is coupled with said reverse gear, said hot press roller is rotated in said first rotating speed if said clutch gear is coupled with said first rotating speed driving roller, and said hot press roller is rotated in said second rotating speed if said clutch gear is coupled with said second rotating speed driving roller.

2. The speed changing transmission mechanism according to claim 1 wherein said reverse gear comprises a reverse gear recess and a recess ratchet pawl, said reverse clutch gear comprises a connecting ratchet pawl, and said connecting ratchet pawl is inserted into said reverse gear recess and engaged with said recess ratchet pawl when said reverse clutch gear is coupled with said reverse gear.

3. The speed changing transmission mechanism according to claim 1 wherein said clutch gear comprises an elastic post and a spring, and said spring is formed in a surface of said clutch gear and connected with said elastic post such that said elastic post is protruded from said surface of said clutch gear.

4. The speed changing transmission mechanism according to claim 3 wherein said first rotating speed driving roller has a first indentation, and said elastic post is received in said first indentation when said clutch gear is coupled with said first rotating speed driving roller.

5. The speed changing transmission mechanism according to claim 3 wherein said first rotating speed driving roller has a second indentation, and said elastic post is received in said second indentation when said clutch gear is coupled with said second rotating speed driving roller.

6. The speed changing transmission mechanism according to claim 1 wherein said first rotating speed is slower than said second rotating speed, and said first rotating speed driving roller is smaller than said second rotating speed driving roller.

7. The speed changing transmission mechanism according to claim 1 wherein said first rotating speed driving roller has a first circular hole, said second rotating speed driving roller has a second circular hole, and said clutch gear has a first D-shaped hole.

8. The speed changing transmission mechanism according to claim 7 wherein said power input shaft penetrating through said first rotating speed driving roller, said second rotating speed driving roller and said clutch gear is a D-shaped shaft, wherein when said power input shaft is driven to rotate, said first rotating speed driving roller having said first circular hole and said second rotating speed driving roller having said second circular hole are not rotated with said power input shaft but said clutch gear having said first D-shaped hole is rotated with said power input shaft.

9. The speed changing transmission mechanism according to claim 1 further comprising:
- a first power output roller arranged at said first side of said reverse gear; and
- a second power output roller arranged at a second side of the reverse gear, wherein said power output shaft further penetrates through said first power output roller and said second power output roller.

10. The speed changing transmission mechanism according to claim 9 wherein said reverse gear has a third circular hole, said reverse clutch gear has a second D-shaped hole, said first power output roller has a third D-shaped hole, and said second power output roller has a fourth D-shaped hole.

11. The speed changing transmission mechanism according to claim 10 wherein said power output shaft penetrating through said reverse gear, said reverse clutch gear, said first power output roller and said second power output roller is a D-shaped shaft, wherein when said power output shaft is driven to rotate, said reverse gear having said third circular hole is not rotated with the D-shaped power output shaft, but said reverse clutch gear having said second D-shaped hole, said first power output roller having said third D-shaped hole, and said second power output roller having said fourth D-shaped hole are rotated with said power output shaft.

12. The speed changing transmission mechanism according to claim 9 further comprising:
- a first belt surrounding around said first power output roller and said first rotating speed driving roller; and
- a second belt surrounding around said second power output roller and said second rotating speed driving roller.

13. The speed changing transmission mechanism according to claim 9 wherein said first power output roller and said second power output roller are belt pulleys.

14. The speed changing transmission mechanism according to claim 1 wherein said shift module further comprises:
- a gliding groove;
- a shift lever partially embedded in said gliding groove and movable along said gliding groove;
- a reverse shift switching element disposed in said gliding groove and in contact with said reverse clutch gear; and
- a speed changing shift switching element disposed in said gliding groove and in contact with said clutch gear, wherein after said shift lever is coupled with said reverse shift switching element, said shift lever is moved such that said reverse clutch gear is coupled with said reverse gear, or after said shift lever is coupled with said speed changing shift switching element, said shift lever is moved such that said clutch gear is coupled with said first rotating speed driving roller or said second rotating speed driving roller.

15. The speed changing transmission mechanism according to claim 1 wherein said power output shaft further penetrates through said hot press roller and a hot press gear, wherein said speed changing transmission mechanism and said hot press gear are arranged on opposite sides of said hot press roller.

16. The speed changing transmission mechanism according to claim 1 wherein said speed changing transmission mechanism further comprises a transmission gear engaged with a hot press gear, and said transmission gear is driven to rotate when said hot press gear is rotated with said power output shaft.

17. The speed changing transmission mechanism according to claim 16 wherein said speed changing transmission mechanism further comprises a transmission shaft penetrating through said transmission gear such that said transmission shaft is rotated with said transmission gear.

18. The speed changing transmission mechanism according to claim 17 wherein said speed changing transmission mechanism further comprises an additional hot press roller parallel with said hot press roller such that said hot press roller and said additional hot press roller are rotated in opposite directions.

* * * * *